United States Patent [19]

Kawamoto

[11] Patent Number: 5,407,791
[45] Date of Patent: Apr. 18, 1995

[54] SILVER HALIDE PHOTOGRAPHIC MATERIAL

[75] Inventor: Fumio Kawamoto, Kanagawa, Japan

[73] Assignee: Fuji Photo Film Co., Ltd., Kanagawa, Japan

[21] Appl. No.: 181,412

[22] Filed: Jan. 14, 1994

[30] Foreign Application Priority Data

Jan. 18, 1993 [JP] Japan .................................. 5-021625

[51] Int. Cl.$^6$ .............................................. G03C 1/76
[52] U.S. Cl. ...................................... 430/532; 430/533; 430/536; 156/643; 264/22
[58] Field of Search ............... 430/532, 533, 536, 523; 156/643; 264/22

[56] References Cited

U.S. PATENT DOCUMENTS

| | | | |
|---|---|---|---|
| 3,475,193 | 10/1969 | Takenaka et al. | 430/512 |
| 3,892,575 | 7/1975 | Watts et al. | 430/532 |
| 4,141,735 | 2/1979 | Schrader et al. | 430/141 |
| 4,247,496 | 1/1981 | Kawakami et al. | 264/22 |
| 4,417,948 | 11/1983 | Mayne-Banton | 156/643 |
| 4,429,039 | 1/1984 | Ochiai | 430/534 |
| 4,824,699 | 4/1989 | Woo et al. | 427/307 |

FOREIGN PATENT DOCUMENTS 0581120  2/1994  European Pat. Off. .
1149812  4/1969  United Kingdom .

OTHER PUBLICATIONS

Encyclopedia of Polymer Science and Engineering, vol. 7, pp. 88–90, 1987, John Wiley & Sons, Inc.
Fulkerson & Hagemeier, Research Disclosure, Item 13221, Apr. 1975.

*Primary Examiner*—Thomas R. Neville
*Attorney, Agent, or Firm*—Sughrue, Mion, Zinn, Macpeak & Seas

[57] ABSTRACT

A silver halide photographic material comprising a polyester support having formed thereon at least one light-sensitive silver halide emulsion layer is disclosed, said polyester support having a glass transition temperature of from 90° to 200° C. and having had at least one side thereof subjected to ultraviolet-light irradiation. The photographic material exhibits improved anticurl properties and high adhesion between the emulsion layer and the support.

8 Claims, 1 Drawing Sheet

SILVER HALIDE PHOTOGRAPHIC MATERIAL

FIELD OF THE INVENTION

This invention relates to a silver halide photographic material and more particularly to a silver halide photographic material having good adhesion between an emulsion layer and a polyester support and excellent anticurl dimensional stability.

BACKGROUND OF THE INVENTION

Methods for forming a silver halide emulsion layer on a polyester support are disclosed, e.g., in JP-B-43-2503 (corresponding to U.S. Pat. No. 3,475,193), JP-A-51-114120, JP-A-1-210947, and JP-A-3-109545 (the term "JP-A" as used herein means an "unexamined published Japanese patent application", and the term "JP-B" as used herein means an "examined Japanese patent publication"). With increasing variety of the use environment of silver halide photographic materials, there has been a demand for a further improvement in adhesion of a silver halide emulsion layer to a polyester support. A conventionally attained level of the adhesion is insufficient particularly for color negative films and color reversal films having a large emulsion layer thickness. Poor adhesion between an emulsion layer and a support would lead to a momentous problem that the image recorded is lost.

On the other hand, a method for reducing curling of a polyester film is disclosed in JP-A-51-16358 (corresponding to U.S. Pat. No. 4,141,735), which comprises subjecting a polyester film to a heat treatment at a temperature lower than the glass transition temperature by 5° to 30° C.

SUMMARY OF THE INVENTION

An object of the present invention is to provide a silver halide photographic material which exhibits excellent mechanical characteristics, excellent adhesion between an emulsion layer and a support, and improved anticurl properties.

The above object of the present invention is accomplished by a silver halide photographic material comprising a polyester support having provided thereon at least one light-sensitive silver halide emulsion layer, said polyester support has a glass transition temperature (hereinafter referred to as a Tg) of from 90° to 200° C. and having had at least one side thereof subjected to ultraviolet-light irradiation.

DETAILED DESCRIPTION OF THE INVENTION

Figure 1:
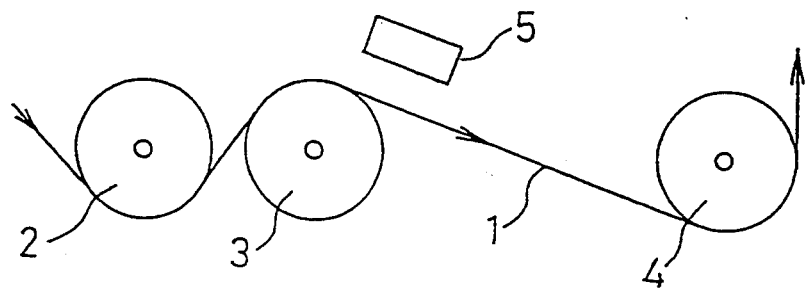
FIG. 1 is a side view of the longitudinal stretching zone according to the present invention.

Ultraviolet (UV) light which can be irradiated to the polyester support has a wavelength of from 180 to 320 nm. In practice, satisfactory results are obtained by use of a quartz-made UV lamp. If a filter absorbing UV light of 320 nm or less is placed between the lamp and a polyester support, the effects of irradiation are significantly reduced.

Where a polyester support is so irradiated with UV light that the intrinsic viscosity of the polyester on the irradiated surface to the depth of 15 μm may be reduced by 1 to 50%, a sufficient adhesive strength can be obtained even in films which have a thick emulsion layer and are subjected to high temperature development, such as color negative films and color reversal films. If the degree of UV light irradiation is too low, sufficient adhesion cannot be secured. If it is too high, the cohesive force of the polyester on the irradiated surface portion is reduced, causing cohesive failure in the surface portion and serious reduction in mechanical characteristics, especially folding endurance.

A preferred intensity of UV irradiation ranges from 20 to 10,000 mJ/cm$^2$, and more preferably from 50 to 2,000 mJ/cm$^2$.

The UV irradiation of a polyester support is preferably carried out after heat setting following stretching. UV-irradiation is effective even when conducted in air.

Even when coated with a subbing layer after having been preserved for a long period of time, for example, a half year or even one year, the UV-irradiated polyester support of the present invention exhibits unchanged adhesion to the subbing layer coated.

Where a support having provided thereon a subbing layer is subjected to a heat treatment for anticurl, the temperature of the support to be irradiated is preferably from 160° to 230° C. If it is less than 160° C., the adhesive strength attained is reduced so that the time of irradiation must be extended. If it is higher than 230° C., the support undergoes thermal shrinkage, failing to retain surface flatness necessary for use as a photographic support.

In coating a subbing layer on the irradiated support, the temperature of the coating composition to be coated and that of the support immediately before coating are preferably from 20° to 50° C. Out of this temperature range, the adhesive strength would be reduced.

On the other hand, where a support is subjected to a heat treatment before coating a subbing layer, UV irradiation should be conducted at a support temperature not higher than the glass transition temperature thereof so as not to deteriorate anticurl properties. The time of UV irradiation, the temperature of a coating composition for a subbing layer, and the temperature of the support to be coated are selected appropriately depending on the desired adhesion level.

When a heat treatment is not conducted, the temperature of the support is from 70° C. to 230° C., preferably from 160° C. to 230° C., and more preferably from 170° C. to 220° C.

On the other hand, when a heat treatment is conducted, normally it is done after UV irradiation.

Further, it is preferred to coat a subbing layer on the support after heat treatment, since the heat treatment after subbing tends to occur the adhesion, irregularities and wrinkling of the support film.

Improved adhesion can be obtained by swelling the irradiated support to cause interfacial mixing with a hydrophilic polymer coated to form a subbing layer.

Compounds which can be used for swelling of the support include resorcin, chlororesorcin, methylresorcin, ocresol, m-cresol, p-cresol, phenol, o-chlorophenol, p-chlorophenol, dichlorophenol, trichlorophenol, monochloroacetic acid, dichloroacetic acid, trifluoroacetic acid, and chloral hydrate, with resorcin and p-chlorophenol being preferred.

The hydrophilic polymers which can be used as a subbing layer include water-soluble polymers, such as gelatin, gelatin derivatives, casein, agar, sodium alginate, starch, polyvinyl alcohol, polyacrylic acid copolymers, and maleic anhydride copolymers; cellulose esters, such as carboxymethyl cellulose and hydroxyethyl cellulose; latex polymers, such as vinyl chloride copolymers, vinylidene chloride copolymers, acrylic ester copolymers, vinyl acetate copolymers, and butadiene copolymers; and water-soluble polyesters. The most preferred of them is gelatin.

The subbing layer may be formed by first coating a copolymer containing a monomer unit selected from vinyl chloride, vinylidene chloride, butadiene, methacrylic acid, acrylic acid, itaconic acid, maleic anhydride, etc., polyethyleneimine, an epoxy resin, grafted gelatin, nitrocellulose, and the like and then coating gelatin thereon.

If desired, the subbing layer may contain a gelatin hardening agent. Examples of suitable gelatin hardening agents include chromates (e.g., chromium alum), aldehydes (e.g., formaldehyde and glutaraldehyde), isocyanate compounds, active halogen compounds (e.g., 2,4-dichloro-6-hydroxytriazine), and epichlorohydrin resins.

The subbing layer may further contain inorganic fine particles, such as particles of silicon dioxide, titanium dioxide or a matting agent, or, organic fine particles, such as particles of a polymethyl methacrylate copolymer having a particle size of from 1 to 10 μm.

The subbing layer may furthermore contain various additives, such as a surface active agent, an antioxidant, an antihalation agent, a dye for coloring, a pigment, a coating aid, an antifoggant, and so forth.

The subbing layer can be formed by any of well-known coating techniques, such as dip coating, air knife coating, curtain coating, roller coating, wire bar coating, gravure coating, and extrusion coating using a hopper as described in U.S. Pat. No. 2,681,294. If desired, two or more subbing layers may be formed simultaneously by the methods disclosed in U.S. Pat. Nos. 2,761,791, 3,508,947, 2,941,898, and 3,526,528 and Yuji Harasaki, *Coating KOGAKU*, p. 253, Asakura Shoten (1973).

A heat treatment of the support is preferably performed at a temperature a little lower than the glass transition temperature from the standpoint of reduction of the treating time. More specifically, the heating temperature is not less than 50° C. and less than the Tg, and preferably not less than a temperature lower than the Tg by 30° C. and less than the Tg. The heat treatment is preferably conducted before coating an emulsion.

The polyester having a Tg of from 90° C. to 200° C. which can be used in the present invention is prepared from a diol component and a dicarboxylic acid component. Specific examples of dicarboxylic acids are terephthalic acid, isophthalic acid, phthalic acid, phthatic anhydride, adipic acid, diphenylene-p,p'-dicarboxylic acid, tetrachlorophthalic acid anhydride, 1,4-cyclohexanedicarboxylic acid, a terephthalic acid halide, 2,6-naphthalenedicarboxylic acid, 1,5-naphthalenedicarboxylic acid, 1,4-naphthalenedicarboxylic acid, and 2,7-naphthalenedicarboxylic acid. Specific examples of diols are ethylene glycol, 1,3-propanediol, 1,2-propanediol, 1,4-butanediol, 1,5-pentanediol, 1,6-hexanediol, 1,7-heptanediol, 1,8-octanediol, 1,10-decanediol, 1,12-dodecanediol, 1,4-cyclohexanediol, 1,4-cyclohexanedimethanol, 1,3-cyclohexanediol, 1,1-cyclohexanedimethanol, catechol, resorcin, hydroquinone, 1,4-benzenedimethanol, 4,4'-isopropylidenediphenol, 4,4'-isopropylidenebishydroxyphenol, and 4,4'-isopropylidenebis(2-chlorophenol).

The polyester may comprise a comonomer unit derived from a compound having a hydroxyl group and a carboxyl group (or an ester thereof) per molecule, for example, p-hydroxybenzoic acid.

Of the polyesters prepared from the above-mentioned diol and dicarboxylic acid components, preferred are homopolymers, such as polyethylene-2,6-dinaphthalate (PEN), polyarylate (PAr), polycyclohexanedimethanol terephthalate (PCT); and copolyesters comprising a dicarboxylic acid component selected from 2,6-naphthalenedicarboxylic acid (NDCA), terephthalic acid (TPA), isophthalic acid (IPA), orthophthalic acid (OPA), cyclohexanedicarboxylic acid (CHDC), and p-phenylenedicarboxylic acid (PPDC), a diol component selected from ethylene glycol (EG), cyclohexanedimethanol (CHDM), neopentyl glycol (NPG), bisphenol A (BPA), and biphenol (BP), and, if desired, a hydroxycarboxylic acid selected from p-hydroxybenzoic acid (PHBA) and 6-hydroxy-2-naphthalenecarboxylic acid (HNCA). Preferred of these copolyesters are NDCA/TPA/EG copolymers with the NDCA:TPA molar ratio being preferably from 0.3:0.7 to 1.0:0 and more preferably from 0.5:0.5 to 0.8:0.2; TPA/EG/BPA copolymers with the EG:BPA molar ratio being preferably from 0.6:0.4 to 0:1.0 and more preferably from 0.5:0.5 to 0:0.9; IPA/PPDC/TPA/EG copolymers with the IPA:TPA molar ratio and PPDC:TPA molar ratio being preferably from 0.1 to 10.0 and from 0.1 to 20.0, respectively, and more preferably from 0.2 to 5.0 and from 0.2 to 10.0, respectively; NDCA/NPG/EG copolymers with the NPG:EG molar ratio being preferably from 1:0 to 0.7:0.3 and more preferably from 0.9:0.1 to 0.6:0.4; TPA/EG/BP copolymers with the EG:BP molar ratio being preferably from 0:1.0 to 0.8:0.2 and more preferably from 0.1:0.9 to 0.7:0.3; and PHBA/EG/TPA copolymers with the PHBA:EG molar ratio being preferably from 1:0 to 0.1:0.9 and more preferably from 0.9:0.1 to 0.2:0.8. Polymer blends, such as a PEN/PET polymer blend at a mixing ratio preferably of from 0.3:0.7 to 1.0:0 and more preferably of from 0.5:0.5 to 0.8:0.2; and a PET/PAr polymer blend at a mixing ratio preferably of from 0.6:0.4 to 0:1.0 and more preferably of from 0.5:0.5 to 0:0.9 are also preferred.

These polyesters preferably have an average molecular weight of from about $5 \times 10^3$ to about $5 \times 10^5$.

The above-mentioned polymer blends can easily be prepared in accordance with the processes disclosed in JP-A-49-5482, JP-A-64-4325, JP-A-3-192718, *Research Disclosure* 283,739-41, ibid 284,779-82, and ibid 294,807-14.

Specific but non-limiting examples of polyesters which can be used for preference are shown below.

HOMOPOLYMERS

PEN: 2,6-naphthalenedicarboxylic acid (NDCA)-/ethylene glycol (EG) (100/100); Tg=119° C.

PCT: terephthalic acid ( TPA )/cyclohexanedimethanol (CHDM) (100/100); Tg=93° C.

PAr: TPA/bisphenol A (BPA) (100/100); Tg=192° C.

COPOLYESTERS

Ratios in the parentheses are by mole.

PBC-1: 2,6-NDCA/TPA/EG (50/50/100); Tg=92° C.

PBC-2: 2,6-NDCA/TPA/EG (75/25/100); Tg=102° C.

PBC-3: 2,6-NDCA/TPA/EG/BPA (50/50/75/25); Tg=112° C.
PBC-4: TPA/EG/BPA (100/50/50); Tg=105° C.
PBC-5: TPA/EG/BPA (100/25/75); Tg=135° C.
PBC-6: TPA/EG/CHDM/BPA (100/25/25/50); Tg=115° C.
PBC-7: IPA/PPDC/TPA/EG (20/50/30/100); Tg=95° C.
PBC-8: NDCA/NPG/EG (100/70/30); Tg=105° C.
PBC-9: TPA/EG/BP (100/20/80); Tg=115° C.
PBC-10: PHBA/EG/TPA (200/100/100); Tg=125° C.

POLYMER BLENDS
Ratios in the parentheses are by weight.
PBB-1: PEN/PET (60/40); Tg=95° C.
PBB-2: PEN/PET (80/20); Tg=104° C.
PBB-3: PAr/PEN (50/50); Tg=142° C.
PBB-4: PAr/PCT (50/50); Tg=118° C.
PBB-5: PAr/PET (60/40); Tg=101° C.
PBB-6: PEN/PET/PAr (50/25/25); Tg=108° C.

All the above-described polyesters have a higher flexural modulus than that of TAC (triacetyl cellulose) and thereby make it feasible to form a film of reduced thickness.

Preferred among the above-described polyesters are PEN, polymer blends containing at least 30% by weight of PEN, and copolyesters having a 2,6-NDCA content of at least 30 mol % based on the total dicarboxylic acid-component, with PEN being more preferred.

The polyester film preferably has a modulus of elasticity of from 500 to 650 kg/mm$^2$, and more preferably from 550 to 600 kg/mm$^2$, in both machine direction (MD) and transverse direction (TD), with an absolute difference in MD modulus and TD modulus being preferably 200 kg/mm$^2$. The polyester film is preferably stretched from 3.1 to 3.8 times in both MD and TD directions. The polyester film preferably has a percent heat shrinkage of not more than 0.3% at 110° C.

In the present invention, the glass transition temperature of the support is defined in terms of that of amorphous polymer.

If desired, the polyester film may contain an UV-absorbent for preventing, fluorescence and for imparting stability with time. UV-absorbents showing no absorption in the visible region are preferred. The UV-absorbent is added in an amount usually of from 0.5 to 20% by weight, and preferably of from 1 to 10% by weight, based on the weight of the polyester film. If the amount of the UV-absorbent is less than 0.5% by weight, no substantial effect of inhibiting UV deterioration is obtained.

Specific examples of suitable UV-absorbents include benzophenone derivatives, e.g., 2,4-dihydroxybenzophenone, 2-hydroxy-4-methoxybenzophenone, 2-hydroxy-4-n-octoxybenzophenone, 4-dodecyloxy-2-hydroxybenzophenone, 2,2',4,4'-tetrahydroxybenzophenone, and 2,2'-dihydroxy-4,4'-dimethoxybenzophenone; benzotriazole derivatives, e.g., 2-(2'-hydroxy-5-methylphenyl)benzotriazole, 2-(2'-hydroxy-3',5'-di-t-butylphenyl)benzotriazole, and 2-(2'-hydroxy-3'-di-t-butyl-5'-methylphenyl)benzotriazole; and salicylic acid derivatives, e.g., phenyl salicylate and methyl salicylate.

Since an aromatic polyester has a refractive index as high as 1.6 to 1.7, light entering from the film edge is apt to be reflected on the interface between the support and the emulsion layer. It is known that such a light piping phenomenon can be avoided by incorporating inert inorganic particles or a dye into the film.

While not limiting, the dyes which can be used for film dyeing are preferably those for gray dyeing, taking general characteristics of photographic materials into consideration. Further, those having excellent heat resistance in the temperature range for polyester film formation and excellent compatibility with polyesters are preferred. From these considerations, commercially available dyes for polyesters, such as "Diaresin" produced by Mitsubishi Chemical Corp. and "Kayaset" produced by Nippon Kayaku Co., Ltd., may be used.

To obtain sufficient effects, dyeing should be effected to such an extent that the dyed film may have a color density of at least 0.01, and preferably at least 0.03, as measured in the visible region with a Macbeth densitometer.

Depending on use, the polyester film may be endowed with good slip. While not limiting, good slip can generally be imparted to the polyester film by incorporating particles of an inert inorganic compound or coating a surface active agent.

Examples of the inert inorganic compound include $SiO_2$, $TiO_2$, $BASO_4$, $CaCO_3$, talc, and kaolin. Instead of externally adding such inert particles, good slip may also be imparted by internally supplied particles resulting from precipitation of a component added to the polymerization system, such as a catalyst. Because transparency is of importance for a support of a photographic material, it is recommended to use $SiO_2$ whose refractive index is relatively close to that of a polyester film as particles to be externally supplied or a compound which can be precipitated into relatively fine particles as internally supplied particles.

In the case of externally supplying slip-imparting particles, it is also preferable to laminate a functional layer for ensuring film transparency. Lamination can be carried out by co-extrusion by means of a plurality of extruders, a feed block or a multi-manifold die.

A backing layer containing an antistatic agent may be provided on the reverse side of the polyester film. Suitable antistatic agents include fine particles of a conductive crystalline metal oxide selected from ZnO, $TiO_3$, $SnO_2$, $Al_2O_3$, $In_2O_3$, $SiO_2$, MgO, BaO, and $MoO_3$ and fine particles of a compound oxide composed of two or more of these metal oxides. The fine particles of the conductive crystalline oxide or compound oxide preferably have a volume resistivity of not more than $10^7$ Ω·cm, and more preferably not more than $10^5$ Ω·cm, and a particle size of from 0.01 to 0.7 μm, and more preferably from 0.02 to 0.5 μm.

A layer containing the above-mentioned antistatic agent may be provided on the polyester support either on the side of a silver halide emulsion layer or on the reverse side (i.e., as a backing layer).

The silver halide emulsion layer may be either for black-and-white films or for color films. The photographic layers will hereinafter be described with reference to color films.

The photographic material of the present invention comprises a polyester support having provided thereon at least one silver halide emulsion layer sensitive to blue light, green light or red light. A light-insensitive layer, such as an intermediate layer, may be provided between silver halide light-sensitive emulsion layers or as an uppermost or undermost layer. The number and order of silver halide emulsion layers and light-insensitive layers are not particularly limited.

The intermediate layer may contain a coupler, a DIR compound, etc. as described in JP-A-61-43748, JP-A-59-113438, JP-A-59-113440, JP-A-61-20037, and JP-A-61-20038 or a color mixing inhibitor as commonly used.

A plurality of silver halide emulsion layers constituting a unit of light-sensitive layers having the same color sensitivity are described in West German Patent 1,121,470, British Patent 923,045, JP-A-57-112751, JP-A-62200350, JP-A-62-206541, JP-A-62-206543, JP-A-56-25738, JP-A-62-63936, JP-A-59-202464, JP-B-55-34932, and JP-B-49-15495.

Silver halide grains may have a regular crystal form, such as a cubic form, an octahedral form, and a tetradecahedral form; an irregular crystal form, such as a spherical form and a plate form; a crystal form having a crystal defect, such as a twinning plane; or a composite crystal form thereof.

Silver halide grains may have a wide range of grain size, including from fine grains of about 0.2 $\mu$m or smaller to large grains having a projected area diameter reaching about 10 $\mu$m. The silver halide emulsion may be either a mono-dispersed emulsion or a poly-dispersed emulsion.

Silver halide photographic emulsions which are used in the present invention can be prepared by the processes described, e.g., in *Research Disclosure* (hereinafter, abbreviated as RD), No. 17643 (Dec., 1978), pp. 22-23, "I. Emulsion Preparation and Types", ibid., No. 18716, p. 648 (Nov., 1979), P. Glafkides, *Chemie et Phisique Photographique*, Paul Montel (1967), G. F. Duffin, *Photographic Emulsion Chemistry*, Focal Press (1966), and V. L. Zelikman et al., *Making and Coating Photographic Emulsion*, Focal Press (1964).

Mono-dispersed emulsions described in U.S. Pat. Nos. 3,574,628 and 3,655,394 and British Patent 1,413,748 are preferably used as well.

Tabular grains having an aspect ratio (an average thickness to average diameter ratio) of about 5 or more are also useful. Such tabular grains can easily be prepared by the processes described, e.g., in Gutoff, *Photographic Science and Engineering*, Vol. 14, pp. 248-257 (1970), U.S. Pat. Nos. 4,434,226, 4,414,310, 4,433,048, and 4,439,520, and British Patent 2,112,157.

The silver halide grains may be homogeneous grains having a uniform crystal structure throughout the individual grains or heterogeneous grains including those in which the inside and the outer shell have different halogen compositions, those in which the halogen composition gradually varies in layers, and those having fused thereto silver halide of different halogen composition through epitaxy. Silver halide grains fused with compounds other than silver halides, e.g., silver rhodanide or lead oxide, may also be used. A mixture comprising grains of various crystal forms is employable.

Silver halide emulsions are usually subjected to physical ripening, chemical ripening, and spectral sensitization. The effects of the present invention are particularly pronounced in using gold-sulfur sensitized emulsions. Additives which can be used in these steps and other known photographic additives which can be used in the present invention are described in RD, Nos. 17643 and 18716 as hereinafter listed.

| | RD 17643 | RD 18716 |
|---|---|---|
| 1. Chemical stabilizer | p. 23 | p. 648 (right column (RC)) |
| 2. Sensitivity increasing agent | | do. |
| 3. Spectral sensitizer, supersensitizer | pp. 23-24 | p. 648, RC to p. 649, RC |
| 4. Whitening agent | p. 24 | |
| 5. Antifoggant, stabilizer | pp. 24-25 | p. 649, RC et seq. |
| 6. Light absorbent, filter dye, UV absorbent | pp. 25-26 | p. 649, RC to p. 640, left column (LC) |
| 7. Stain inhibitor | p. 25, RC | p. 650 LC to RC |
| 8. Dye image stabilizer | p. 25 | |
| 9. Hardening agent | p. 26 | p. 651, LC |
| 10. Binder | p. 26 | do. |
| 11. Plasticizer, lubricant | p. 27 | p. 650, RC |
| 12. Coating aid, surface active agent | pp. 26-27 | p. 650, RC |

In order to prevent deterioration in photographic performance due to formaldehyde gas, a compound capable of reacting with formaldehyde to fix it as described in U.S. Pat. Nos. 4,411,987 and 4,435,503 is preferably added to light-sensitive materials.

Various color couplers can be used in the present invention. Specific examples of useful color couplers are described in patents cited in RD, No. 17643, VII-C to G.

Examples of suitable yellow couplers which can be used in the present invention are described, e.g., in U.S. Pat. Nos. 3,933,501, 4,022,620, 4,326,024, 4,401,752, and 4,248,961, JP-B-58-10739, British Patents 1,425,020 and 1,476,760, U.S. Pat. Nos. 3,973,968, 4,314,023, and 4,511,649, and EP 249,473A.

Examples of suitable magenta couplers include 5-pyrazolone couplers and pyrazoloazole couplers. Examples of particularly preferred magenta couplers are described in U.S. Pat. Nos. 4,310,619 and 4,351,897, European Patent 73,636, U.S. Pat. Nos. 3,061,432 and 3,725,067, RD No. 24220 (June, 1984), JP-A-60-33552, RD No. 24230 (June, 1984), JP-A-60-43659, JP-A-61-72238, JP-A-60-35730, JP-A-55-118034, JP-A-60-185951, U.S. Pat. Nos. 4,500,630, 4,540,654, and 4,556,630, and WO (PCT) 88/04795.

Cyan couplers include phenol couplers and naphthol couplers. Examples of suitable couplers are described in U.S. Pat. Nos. 4,052,212, 4,146,396, 4,228,233, 4,296,200, 2,369,929, 2,801,171, 2,772,162, 2,895,826, 3,772,002, 3,758,308, 4,334,011, and 4,327,173, West German Patent. (OLS) No. 3,329,729, EP 121,365A, EP 249,453A, U.S. Pat. Nos. 3,446,622, 4,333,999, 4,753,871, 4,451,559, 4,427,767, 4,690,889, 4,254,212, and 4,296,199, and JP-A-61-42658.

Examples of suitable colored couplers which can be used for correcting unnecessary absorption of a developed dye are those described in RD, No. 17643, VII-G, U.S. Pat. No. 4,163,670, JP-B-57-39413, U.S. Pat. Nos. 4,004,929 and 4,138,258, and British Patent 1,146,368.

Examples of suitable couplers which develop a dye having moderate diffusibility are described in U.S. Pat. No. 4,366,237, British Patent 2,125,570, European Patent 96,570, and West German Patent (OLS) No. 3,234,533.

Typical examples of polymerized dye-forming couplers are described in U.S. Pat. Nos. 3,451,820, 4,080,211, 4,367,282, 4,409,320, and 4,576,910, and British Patent 2,102,137.

Couplers capable of releasing a photographically useful residue on coupling are also used to advantage.

Examples of suitable DIR couplers capable of releasing a development inhibitor are described in patents cited in RD, No. 17643, VII-F, JP-A-57-151944, JP-A-57-154234, JP-A-60-184248, JP-A-63-37346, and U.S. Pat. No. 4,248,962.

Couplers capable of imagewise releasing a nucleating agent or a development accelerator at the time of development preferably include those described in British Patents 2,097,140 and 2,131,188, JP-A-59-157638, and JP-A-59-170840.

Additional examples of couplers which can be used in the light-sensitive material of the present invention include competing couplers as described in U.S. Pat. No. 4,130,427; polyequivalent couplers as described in U.S. Pat. No. 4,283,472; poly-equivalent couplers as described in U.S. Pat. Nos. 4,283,472, 4,338,393, and 4,310,618; couplers capable of releasing a DIR redox compound, couplers capable of releasing a DIR coupler, redox compounds capable of releasing a DIR coupler, or redox compounds capable of releasing a DIR redox compound as described in JP-A-60-185950 and JP-A-62-24252; couplers capable of releasing a dye which restores its color after release as described in EP 173,302A; couplers capable of releasing a bleaching accelerator as described in RD Nos. 11449 and 24241 and JP-A-61-201247; couplers capable of releasing a ligand as described in U.S. Pat. No. 4,553,477; and couplers capable of releasing a leuco dye as described in JP-A-63-75747.

The couplers can be introduced into photographic materials by various known dispersion methods.

High-boiling organic solvents which are useful in an oil-in-water dispersion method are described, e.g., in U.S. Pat. No. 2,322,027. Specific examples of high-boiling organic solvents having a boiling point of 175° C. or higher under atmospheric pressure which can be used in the oil-in-water dispersion method are phthalic esters, phosphoric or phosphonic esters, benzoic esters, amides, alcohols, phenols, aliphatic carboxylic esters, aniline derivatives, and hydrocarbons. Organic solvents having a boiling point of not lower than about 30° C., and preferably from 50° C. to about 160° C. may be used in combination as an auxiliary solvent. Typical examples of such an auxiliary solvent are ethyl acetate, butyl acetate, ethyl propionate, methyl ethyl ketone, cyclohexanone, 2-ethoxyethyl acetate, and dimethylformamide.

With respect to a latex dispersion method, the steps involved, the effects, and specific examples of loadable latices are described in U.S. Pat. No. 4,199,363 and West German Patent (OLS) Nos. 2,541,274 and 2,541,230.

In the light-sensitive materials of the present invention, the hydrophilic colloidal layers on the side having emulsion layers preferably have a total film thickness of not more than 28 μm and a rate of swelling $T_{\frac{1}{2}}$ of not more than 30 seconds. The terminology "film thickness" as used herein means a film thickness as measured after conditioning at 25° C. and a relative humidity of 55% for 2 days. The rate of swelling $T_{\frac{1}{2}}$ can be determined by methods known in the art. The rate of swelling $T_{\frac{1}{2}}$ can be controlled by adding a proper amount of a hardening agent for a gelatin binder or by varying aging conditions after coating.

Further, the light-sensitive material preferably has a degree of swelling of from 150 to 400%. The terminology "degree of swelling" as used herein means a value obtained from the maximum swollen film thickness according to formula: (maximum swollen film thickness—film thickness)/film thickness.

The above-described color photographic materials of the present invention can be development processed according to usual methods as described in RD, No. 17643, pp. 28-29 and ibid., No. 18716, p. 615, left to right columns.

For the purpose of simplifying and speeding up of processing, the silver halide color light-sensitive material of the present invention may contain therein a color developing agent, preferably in the form of a precursor thereof. Examples of color developing agent precursors include indoaniline compounds described in U.S. Pat. No. 3,342,597, Schiff base compounds described in U.S. Pat. No. 3,342,599 and RD, Nos. 14850 and 15159, and aldol compounds described in RD, No. 13924.

The present invention will now be illustrated in greater detail with reference to Examples, but the present invention should not be Construed as being limited thereto. All the parts are by weight unless otherwise indicated.

The glass transition temperature (Tg) of polyesters used in Examples was measured as follows. A sample film weighing 10 mg was heated in a helium-nitrogen stream at a rate of temperature rise of 20° C./min by means of a differential scanning calorimeter (DSC) to prepare a DTA curve. An arithmetic mean of the temperature at which the curve begins to deviate from the base line and the temperature at which the curve returns to the base line or the temperature at which an endothermic peak, if any appears, reaches the maximum was taken as a Tg.

EXAMPLE 1

1Preparation of Support

PEN chips were melt-extruded at 300° C., stretched 3.4 times in the longitudinal direction and 4 times in the width direction. As shown in FIG. 1, infrared heater 5 as an auxiliary heating source was placed by one side of polyester film 1 (in this Example the side having contacted with a casting drum, hereinafter referred to as a CD side) during longitudinal stretching so as to heat the CD side to 140° C. In FIG. 1, numerals 2, 3 and 4 are rolls for longitudinal stretching. The stretching in the width direction was carried out at 130° C. The biaxially stretched film was then subjected to heat setting at 250° C. for 6 seconds to prepare a biaxially stretched PEN film having a thickness of 80 μm and a Tg of 119° C. The thus prepared film (designated Film A-1) has tendency to curling with its side having been longitudinally stretched at a lower surface temperature inward.

2) Heat Treatment of Support

Film A-1 was wrapped around a core having a diameter of 30 cm with its side to be coated with a subbing layer outward and subjected to a heat treatment at a temperature shown in Table 1 below for 24 hours. The resulting support was designated Film A-2 to 5.

TABLE 1

| Film No. | Heat-Treatment Temperature (24 hrs) (°C.) |
|---|---|
| A-1 | not conducted |
| A-2 | 110 |
| A-3 | 125 |
| A-4 | 55 |
| A-5 | 45 |

3) UV Irradiation of Support

Both sides of each of films A-1 to A-5 were subjected to UV irradiation under the following conditions to prepare supports A-1, A-2-1 to A-2-10, and A-3 to A-5.

Twenty mercury lamps having a rated voltage of 1900 V, a lamp power of 3800 W, a lamp voltage of 1020 V, and a lamp current of 4.4 A were aligned at 1 m intervals in 20 m long irradiation zone at a distance of 10 cm from the support. The support temperature during UV irradiation was varied as shown in Table 3 below. The running speed of the support was varied between 0.5 m/min to 100 m/min to make a difference in degree of UV irradiation as shown in Table 3. In Table 3, the degree of UV irradiation is expressed in terms of a reduction in intrinsic viscosity of the portion of the support from the irradiated surface to the depth of 15 μm.

Figure 2:
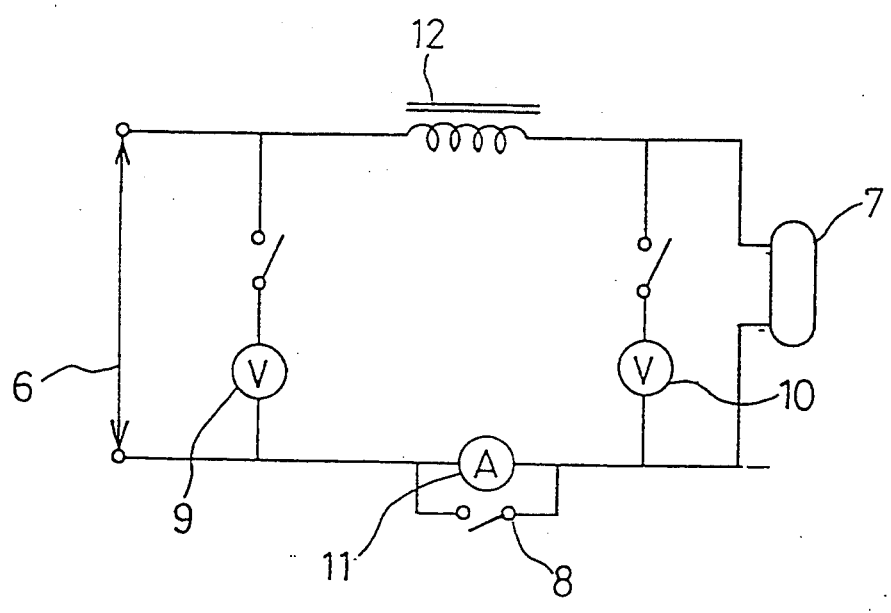
FIG. 2 is a circuit view for lighting the lamp for the measurement of light intensity.

The intensity (D) of light from the mercury lamp used was 20±1 as measured using the circuit for lighting the lamp shown in FIG. 2 as follows. Lamp 7 is turned on and off by switch 8. The voltage supplied from power source 6, the lamp voltage, and the lamp current were measured with voltmeter 9, voltmeter 10, and ammeter 11, respectively. The circuit had the following characteristics.

Power source voltage: 1800±50 V
Lamp current: 4.4 A
Impedance voltage of stabilizer 12 (choke coil): 1350 V (with a lamp current of 4.4 A).

The measurement of light intensity D was made at 6 positions of each lamp selected from the front and rear sides thereof at a measuring wavelength of 254 nm. Light intensity D was calculated from supplied voltage A (V) and deflection X of a galvanometer according to equation:

$$D = 1800 X/A$$

4) Coating of Subbing Layer

A coating composition having the following formulation was coated on the support at a spread of 10 cc/m². After drying at 115° C. for 2 minutes, the film was wound.

| Formulation of Subbing Layer: | |
|---|---|
| Gelatin | 1 part |
| Distilled water | 1 part |
| Acetic acid | 1 part |
| Methanol | 50 parts |
| Ethylene dichloride | 50 parts |
| p-Chlorophenol | 4 parts |

5) Coating of Backing Layer

In 3000 parts of ethanol were dissolved 230 parts of stannic chloride hydrate and 23 parts of antimony trichloride to prepare a uniform solution. To the solution was added dropwise a 1N sodium hydroxide aqueous solution to adjust to a pH of 3 thereby to co-precipitate colloidal stannic oxide and antimony oxide. The precipitate was allowed to stand at 50° C. for 24 hours to obtain a reddish brown colloidal precipitate, which was collected by centrifugation.

The solid was washed three times with water by centrifugation to remove excess ions.

In 1500 parts of water was dispersed 200 parts of colloidal precipitate, and the dispersion was atomized into a calcining furnace heated at 600° C. to obtain blue-tinted fine particles of tin-antimony compound oxide having an average particle size of 0.2 μm and a volume resistivity of 25 Ω·cm.

A mixture of 40 parts of the resulting fine particles and 60 parts of water was adjusted to pH 7.0, coarsely dispersed in a stirrer, and finely dispersed in a horizontal sand mill (Dynomill, manufactured by Willya Bachofen AG) for a retention time of 30 minutes to prepare a dispersion of conductive fine particles.

A coating composition having formulation A shown below was coated on the support on the side opposite to the subbing layer to a dry thickness of 0.3 μm and dried at 115° C. for 30 seconds. On the thus formed layer was further coated a coating composition having formulation B shown below to a dry thickness of 0.1 μm and dried at 115° C. for 2 minutes to form a backing layer.

| Formulation A: | |
|---|---|
| Dispersion of conductive particles above prepared | 10 parts |
| Gelatin | 1 part |
| Water | 10 parts |
| Methanol | 60 parts |
| Resorcin | 2 parts |
| Polyoxyethylene nonylphenyl ether | 0.01 part |
| Formulation B: | |
| Cellulose triacetate | 1 part |
| Acetone | 70 parts |
| Methanol | 15 parts |
| Dichloromethane | 10 parts |
| p-Chlorophenol | 4 parts |

6) Coating of Light-sensitive Layers

Layers having the following compositions were coated on the subbing layer in the order listed to prepare a multi-layer color light-sensitive material (designated A-1, A-2-1 to 10, and A-3 to 5).

The following abbreviations are used for the components used to represent their several function.

ExC: Cyan coupler
ExM: Magenta coupler
ExY: Yellow coupler
ExS: Sensitizing dye
UV: Ultraviolet absorbent
HBS: High-boiling organic solvent
H: Gelatin hardening agent

| 1st Layer (Antihalation Layer): | |
|---|---|
| Black colloidal silver | 0.18 g-Ag/m² |
| Gelatin | 1.40 g/m² |
| ExM-1 | 0.18 g/m² |
| ExF-1 | 2.0 × 10⁻³ g/m² |
| HBS-1 | 0.20 g/m² |
| 2nd Layer (Intermediate Layer): | |
| Emulsion G | 0.065 g-Ag/m² |
| 2,5-di-t-Pentadecylhydroquinone | 0.18 g/m² |
| ExC-2 | 0.020 g/m² |
| UV-1 | 0.060 g/m² |
| UV-2 | 0.080 g/m² |
| UV-3 | 0.10 g/m² |
| HBS-1 | 0.10 g/m² |
| HBS-2 | 0.020 g/m² |
| Gelatin | 1.04 g/m² |
| 3rd Layer (Low Sensitivity Red-Sensitive Emulsion Layer): | |
| Emulsion A | 0.25 g-Ag/m² |
| Emulsion B | 0.25 g-Ag/m² |
| ExS-1 | 6.9 × 10⁻⁵ mol/mol-AgX (X: halogen) |
| ExS-2 | 1.8 × 10⁻⁵ mol/mol-AgX |
| ExS-3 | 3.1 × 10⁻⁴ mol/mol-Agx |
| ExC-1 | 0.17 g/m² |
| ExC-3 | 0.030 g/m² |
| ExC-4 | 0.10 g/m² |
| ExC-5 | 0.020 g/m² |
| ExC-7 | 0.0050 g/m² |

-continued

| | |
|---|---|
| ExC-8 | 0.010 g/m² |
| Cpd-2 | 0.025 g/m² |
| HBS-1 | 0.10 g/m² |
| Gelatin | 0.87 g/m² |

4th Layer (Middle Sensitivity Red-Sensitive Emulsion Layer):

| | |
|---|---|
| Emulsion D | 0.70 g-Ag/m² |
| ExS-1 | 3.5 × 10⁻⁴ mol/mol-AgX |
| ExS-2 | 1.6 × 10⁻⁵ mol/mol-AgX |
| ExS-3 | 5.1 × 10⁻⁴ mol/mol-AgX |
| ExC-1 | 0.13 g/m² |
| ExC-2 | 0.060 g/m² |
| ExC-3 | 0.0070 g/m² |
| ExC-4 | 0.090 g/m² |
| ExC-5 | 0.025 g/m² |
| ExC-7 | 0.0010 g/m² |
| ExC-8 | 0.0070 g/m² |
| Cpd-2 | 0.023 g/m² |
| HBS-1 | 0.10 g/m² |
| Gelatin | 0.75 g/m² |

5th Layer (High Sensitivity Red-Sensitive Emulsion Layer):

| | |
|---|---|
| Emulsion E | 1.40 g-Ag/m² |
| ExS-1 | 2.4 × 10⁻⁴ mol/mol-AgX |
| ExS-2 | 1.0 × 10⁻⁴ mol/mol-AgX |
| ExS-3 | 3.4 × 10⁻⁴ mol/mol-AgX |
| ExC-1 | 0.12 g/m² |
| ExC-3 | 0.045 g/m² |
| ExC-6 | 0.020 g/m² |
| ExC-8 | 0.025 g/m² |
| Cpd-2 | 0.050 g/m² |
| HBS-1 | 0.22 g/m² |
| HBS-2 | 0.10 g/m² |
| Gelatin | 1.20 g/m² |

6th Layer (Intermediate Layer):

| | |
|---|---|
| Cpd-1 | 0.10 g/m² |
| HBS-1 | 0.50 g/m² |
| Gelatin | 1.10 g/m² |

7th Layer (Low Sensitivity Green-Sensitive Emulsion Layer):

| | |
|---|---|
| Emulsion C | 0.35 g-Ag/m² |
| ExS-4 | 3.0 × 10⁻⁵ mol/mol-AgX |
| ExS-5 | 2.1 × 10⁻⁴ mol/mol-AgX |
| ExS-6 | 8.0 × 10⁻⁴ mol/mol-AgX |
| ExM-1 | 0.010 g/m² |
| ExM-2 | 0.33 g/m² |
| ExM-3 | 0.086 g/m² |
| ExY-1 | 0.015 g/m² |
| HBS-1 | 0.30 g/m² |
| HBS-3 | 0.010 g/m² |
| Gelatin | 0.73 g/m² |

8th Layer (Middle Sensitivity Green-Sensitive Emulsion Layer):

| | |
|---|---|
| Emulsion D | 0.80 g-Ag/m² |
| ExS-4 | 3.2 × 10⁻⁵ mol/mol-AgX |
| ExS-5 | 2.2 × 10⁻⁴ mol/mol-AgX |
| ExS-6 | 8.4 × 10⁻⁴ mol/mol-AgX |
| ExM-2 | 0.13 g/m² |
| ExM-3 | 0.030 g/m² |
| ExY-1 | 0.018 g/m² |
| HBS-1 | 0.16 g/m² |
| HBS-3 | 8.0 × 10⁻³ g/m² |
| Gelatin | 0.90 g/m² |

9th Layer (High Sensitivity Green-Sensitive Emulsion Layer):

| | |
|---|---|
| Emulsion E | 1.25 g-Ag/m² |
| ExS-4 | 3.7 × 10⁻⁵ mol/mol-AgX |
| ExS-5 | 8.1 × 10⁻⁵ mol/mol-AgX |
| ExS-6 | 3.2 × 10⁻⁴ mol/mol-AgX |
| ExC-1 | 0.010 g/m² |
| ExM-1 | 0.030 g/m² |
| ExM-4 | 0.040 g/m² |
| ExM-5 | 0.019 g/m² |
| Cpd-3 | 0.040 g/m² |
| HBS-1 | 0.25 g/m² |
| HBS-2 | 0.10 g/m² |
| Gelatin | 1.44 g/m² |

10th Layer (Yellow Filter Layer):

| | |
|---|---|
| Yellow colloidal layer | 0.030 g-Ag/m² |
| Cpd-1 | 0.16 g/m² |
| HBS-1 | 0.60 g/m² |
| Gelatin | 0.60 g/m² |

11th Layer (Low Sensitivity Blue-Sensitive Emulsion Layer):

| | |
|---|---|
| Emulsion C | 0.18 g-Ag/m² |
| ExS-7 | 8.6 × 10⁻⁴ mol/mol-AgX |
| ExY-1 | 0.020 g/m² |
| ExY-2 | 0.22 g/m² |
| ExY-3 | 0.50 g/m² |
| ExY-4 | 0.020 g/m² |
| HBS-1 | 0.28 g/m² |
| Gelatin | 1.10 g/m² |

12th Layer (Middle Sensitivity Blue-Sensitive Emulsion Layer):

| | |
|---|---|
| Emulsion D | 0.40 g-Ag/m² |
| ExS-7 | 7.4 × 10⁻⁴ mol/mol-AgX |
| ExC-7 | 7.0 × 10⁻³ g/m² |
| ExY-2 | 0.050 g/m² |
| ExY-3 | 0.10 g/m² |
| HBS-1 | 0.050 g/m² |
| Gelatin | 0.78 g/m² |

13th Layer (High Sensitivity Blue-Sensitive Emulsion Layer):

| | |
|---|---|
| Emulsion F | 1.00 g-Ag/m² |
| ExS-7 | 4.0 × 10⁻⁴ mol/mol-AgX |
| ExY-2 | 0.10 g/m² |
| ExY-3 | 0.10 g/m² |
| HBS-1 | 0.070 g/m² |
| Gelatin | 0.86 g/m² |

14th Layer (1st Protective Layer):

| | |
|---|---|
| Emulsion G | 0.20 g-Ag/m² |
| UV-4 | 0.11 g/m² |
| UV-5 | 0.17 g/m² |
| HBS-1 | 5.0 × 10⁻² g/m² |
| Gelatin | 1.00 g/m² |

15th Layer (2nd Protective Layer):

| | |
|---|---|
| H-1 | 0.40 g/m² |
| B-1 (diameter: 1.7 μm) | 5.0 × 10⁻² g/m² |
| B-2 (diameter: 1.7 μm) | 0.10 g/m² |
| B-3 | 0.10 g/m² |
| S-1 | 0.20 g/m² |
| Gelatin | 1.20 g/m² |

In order to improve preservability, processability, pressure resistance, antifungal and antibacterial activity, antistatic activity, and coating properties, W-1 to 3, B-4 to 6, F-1 to 17, an iron salt, a lead salt, a gold salt, a platinum salt, an iridium salt, and a rhodium salt were appropriately added to layers.

Emulsions used in the samples are shown in Table 2.

TABLE 2

| Emulsion | Average AgI Content (%) | Mean Grain Size (μm) | Coefficient of Variation of Grain Size (%) | Aspect Ratio | Core/middle/shell Silver Content (AgI Content) | Structure and Shape of Grains |
|---|---|---|---|---|---|---|
| A | 4.0 | 0.45 | 27 | 1 | 1/3 (13/1) | double-layered, octahedral |
| B | 8.9 | 0.70 | 14 | 1 | 3/7 (25/2) | double-layered, octahedral |
| C | 2.0 | 0.55 | 25 | 7 | — | uniform, tabular |
| D | 9.0 | 0.65 | 25 | 6 | 12/59/29 (0/11/8) | triple-layered, |

TABLE 2-continued

| Emulsion | Average AgI Content (%) | Mean Grain Size (μm) | Coefficient of Variation of Grain Size (%) | Aspect Ratio | Core/middle/shell Silver Content (AgI Content) | Structure and Shape of Grains |
| --- | --- | --- | --- | --- | --- | --- |
| E | 9.0 | 0.85 | 23 | 5 | 8/59/33 (0/11/8) | tabular triple-layered, |
| F | 14.5 | 1.25 | 25 | 3 | 37/63 (34/2) | tabular double-layered, plate-like |
| G | 1.0 | 0.07 | 15 | 1 | — | uniform, fine |

Emulsions A to F had been subjected to reduction sensitization using thiourea dioxide and thiosulfonic acid during grain formation in accordance with Examples of JP-A-2-191938.

Emulsion A to F had been subjected to gold-sulfur-selenium sensitization in the presence of the respective spectral sensitizing dyes and sodium thiocyanate in accordance with Examples of JP-A-3-237450.

The tabular grains were prepared by using low-molecular weight gelatin in accordance with Examples of JP-A-1-158426.

The tabular grains and normal crystal grains having a grain structure revealed a dislocation line as described in. JP-A-3-237450 under a high-pressure electron microscope.

Couplers and other various additives used in the samples are shown below.

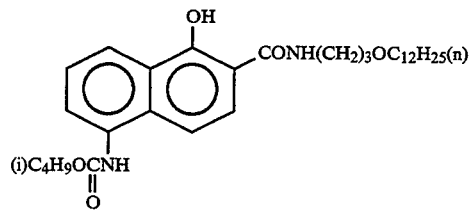

ExC-1:

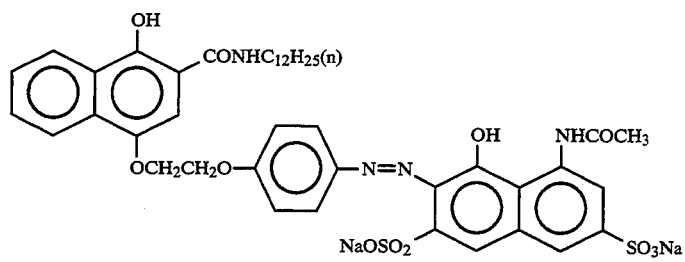

ExC-2:

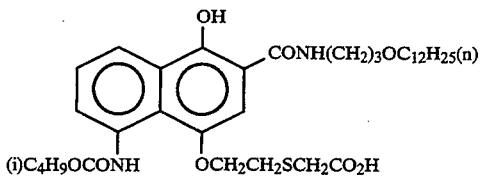

ExC-3:

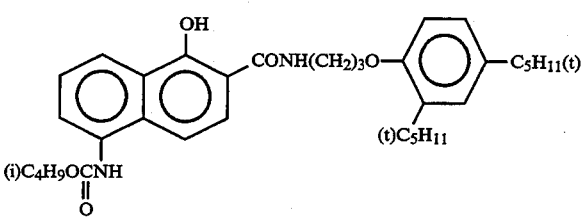

ExC-4:

ExC-5:
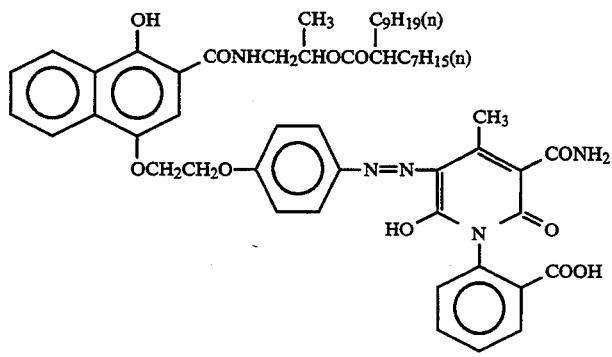
ExC-6:
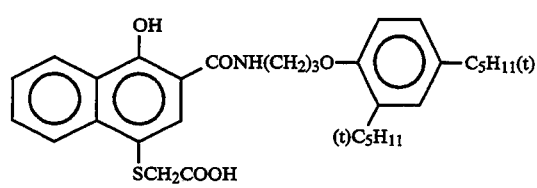
ExC-7:
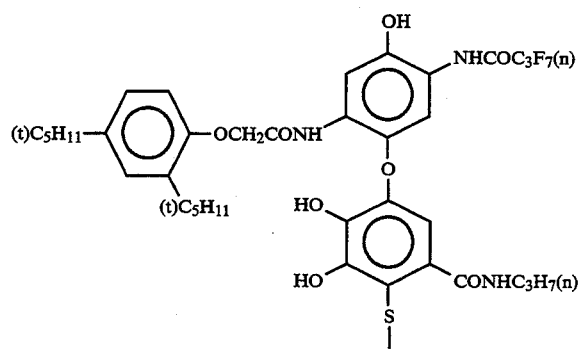
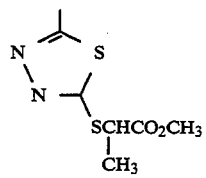
ExC-8:
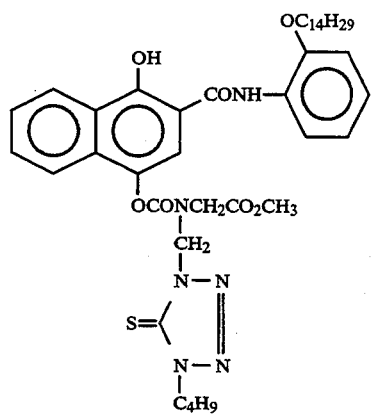

-continued
ExM-1:
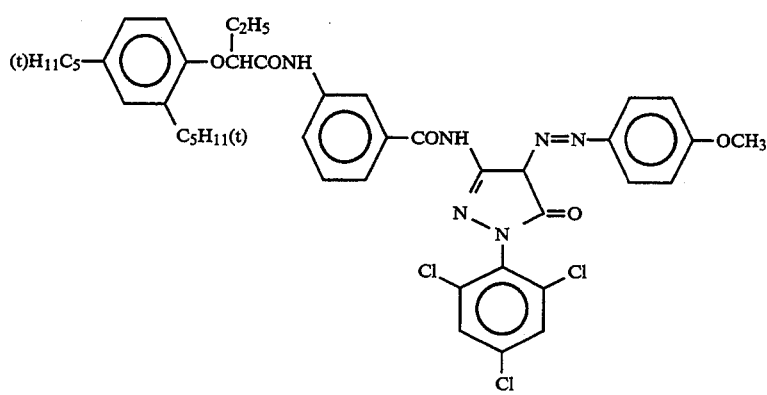
ExM-2:
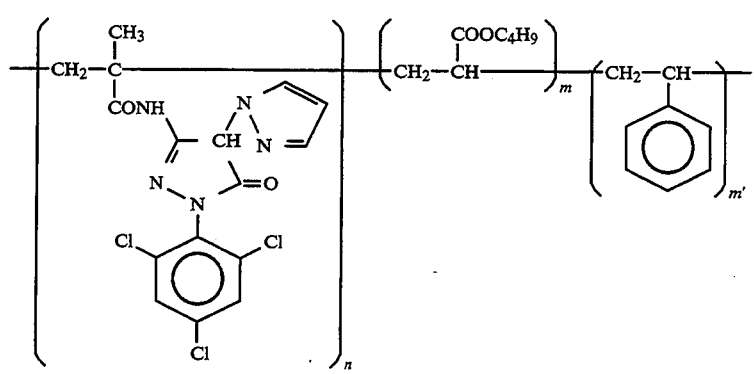
wherein n: 50; m: 25; m': 25; molecular weight: about 20,000
ExM-3:
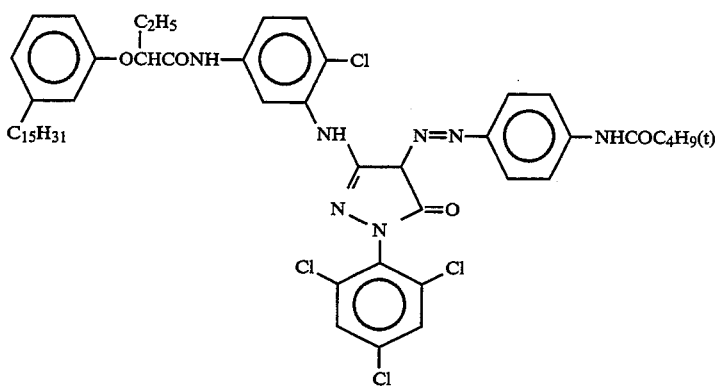
ExM-4:
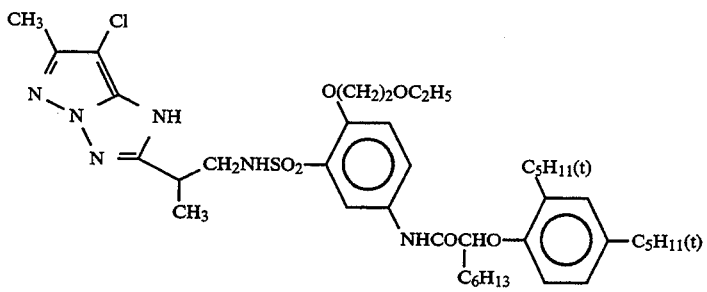

ExM-5:
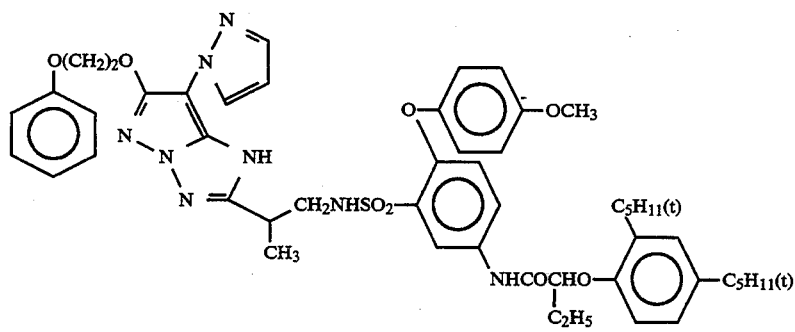
ExY-1:
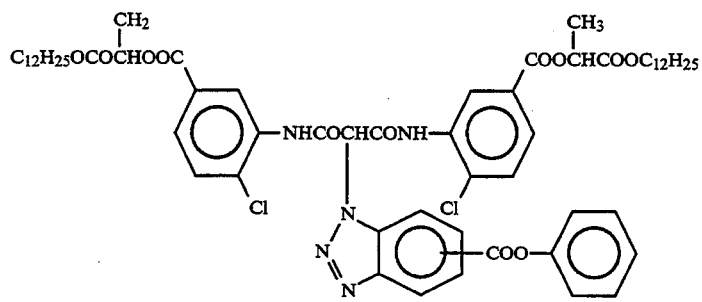
ExY-2:
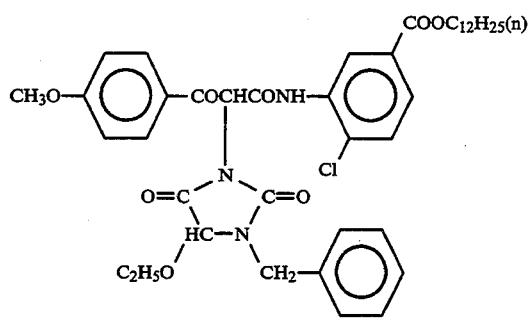
ExY-3:
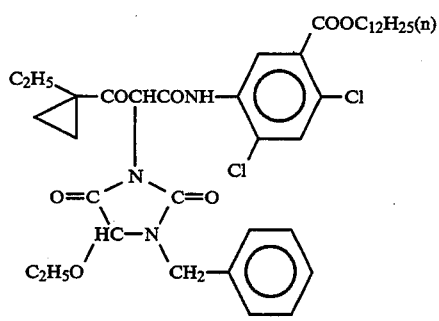
ExY-4:
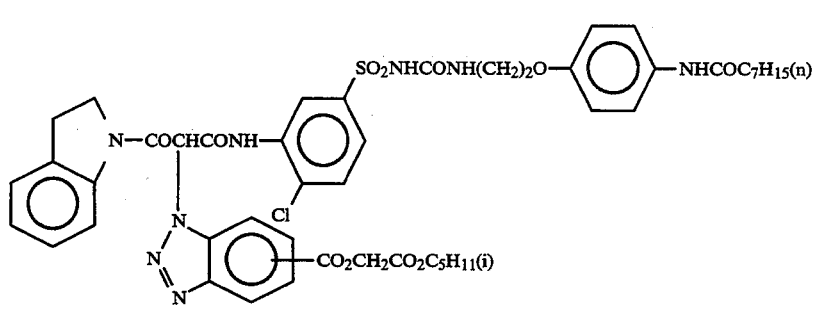

-continued
ExF-1
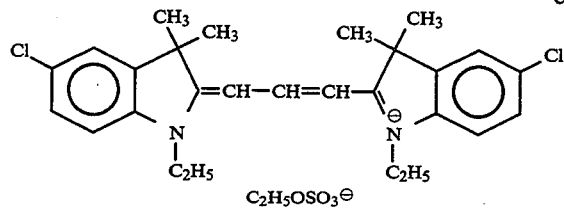
Cpd-1:
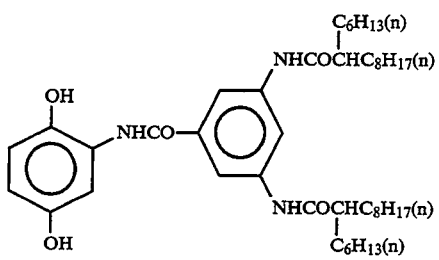
Cpd-2:
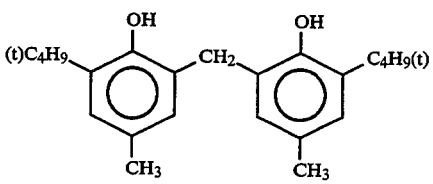
Cpd-3:
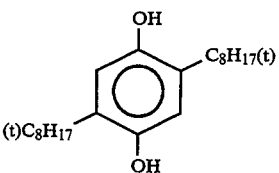
UV-1:
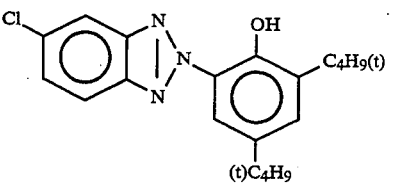
UV-2:
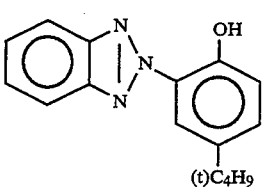
UV-3:
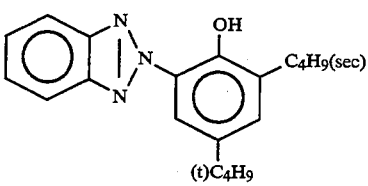
UV-4:
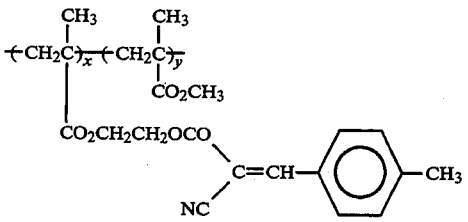
x:y = 70:30 (wt%)

-continued
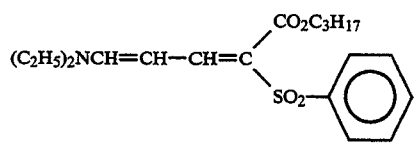   UV-5:
Tricresyl phosphate   HBS-1:
Di-n-butyl phthalate   HBS-2:
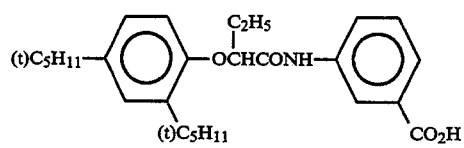   HBS-3:
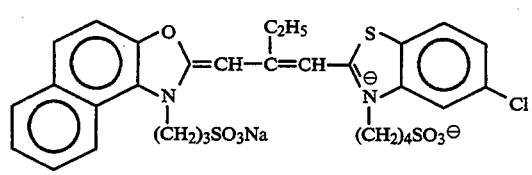   ExS-1:
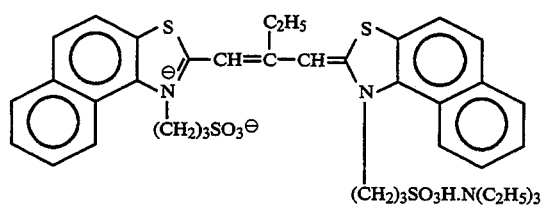   ExS-2:
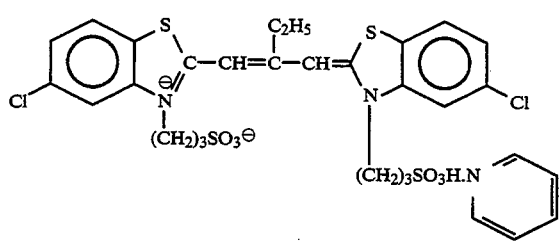   ExS-3:
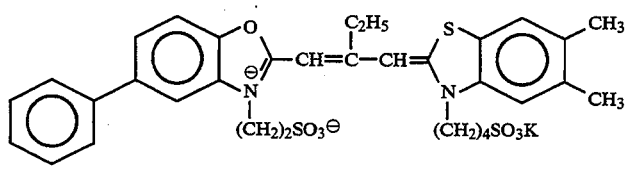   ExS-4:
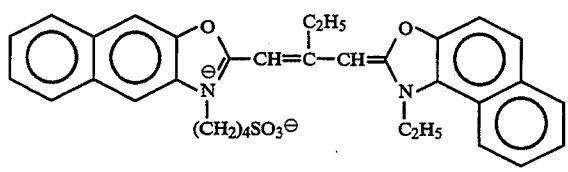   ExS-5:
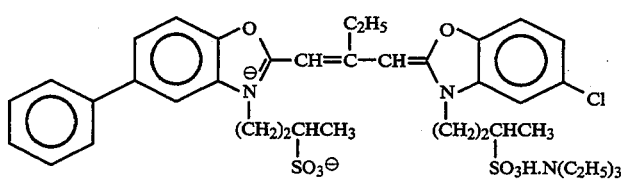   ExS-6:

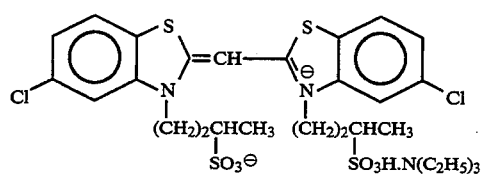
ExS-7:
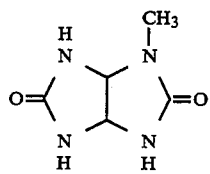
S-1:
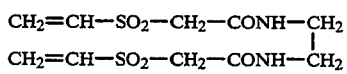
H-1:
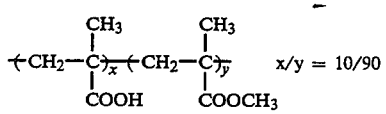
B-1:
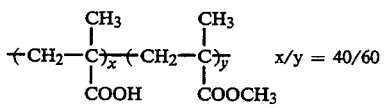
B-2:
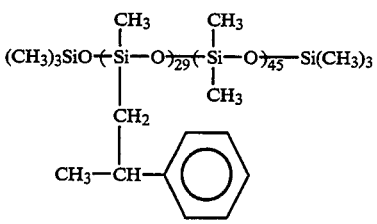
B-3:
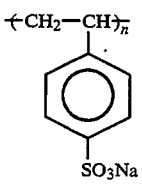
B-4:
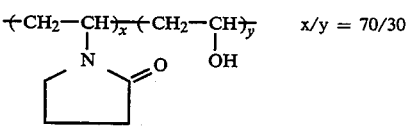
B-5:
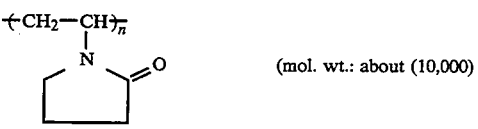
B-6:
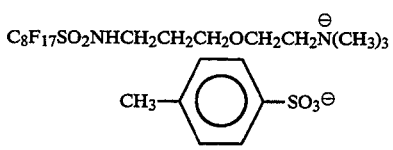
W-1:
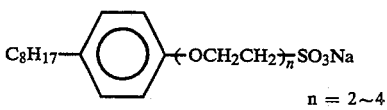
W-2:

W-3:
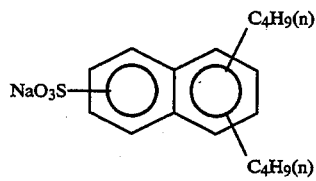
F-1:
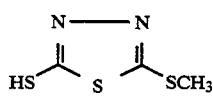
F-2:
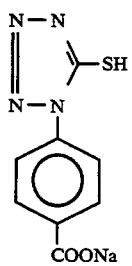
F-3:
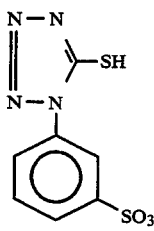
F-4:
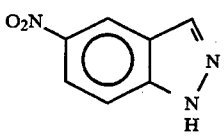
F-5:
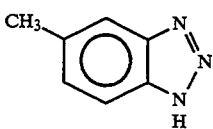
F-6:
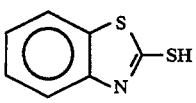
F-7:
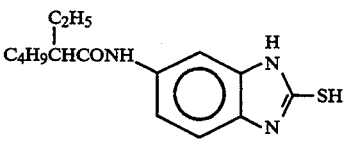
F-8:
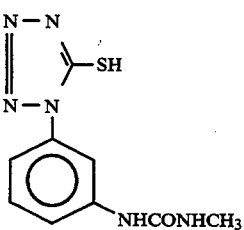
F-9:
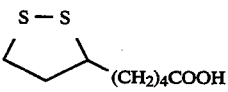

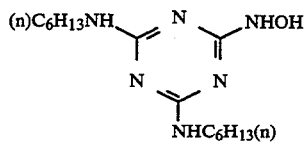 F-10:

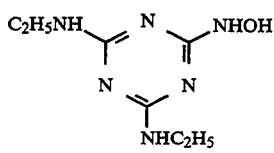 F-11:

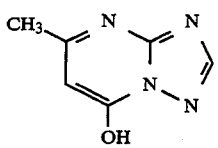 F-12:

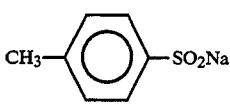 F-13:

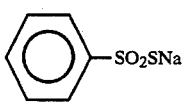 F-14:

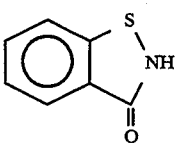 F-15:

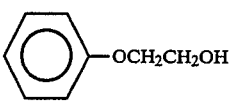 F-16:

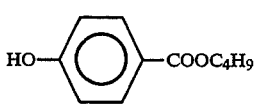 F-17:

7) Evaluation

Each of the resulting samples was evaluated for anticurl properties, adhesion between the support and the emulsion layers, and folding endurance according to the following test methods.

7-1) Anticurl Properties

The sample film was cut into a 35 mm wide and 1.2 m long slit. After conditioning at 25° C. and 60% RH for one night, the slit was rolled around a spool having a diameter of 8 mm with its light-sensitive side inward and heated in a sealed container at 80° C. for 2 hours to set the slit. The heating conditions given to the slit correspond to the situation in which a film is placed in an automobile in a summer day.

After being allowed to cool in a room at 25° C. overnight, the core-set sample film was taken out of the container, and the film was subjected to development processing according to the following schedule by means of an automatic developing machine (Minilabo FP-550B, manufactured by Fuji Photo Film Co., Ltd.), The sample before development processing will hereinafter be referred to as a green sample, that during the development processing as a wet sample, and that after the development processing as a dry sample, respectively.

| Schedule of Development Processing: | | |
|---|---|---|
| Processing Step | Temperature (°C.) | Time (min.) |
| Development | 38 | 3 |
| Stop | 38 | 1 |
| Washing | 38 | 1 |
| Bleaching | 38 | 2 |
| Washing | 38 | 1 |
| Fixing | 38 | 2 |
| Washing | 38 | 1 |
| Stabilizing | 38 | 1 |

Processing solutions used had the following compositions.

Color Developer:

| | |
|---|---|
| Sodium hydroxide | 2 g |
| Sodium sulfite | 2 g |
| Potassium bromide | 0.4 g |
| Sodium chloride | 1 g |
| Borax | 4 g |

-continued

| Schedule of Development Processing: | |
|---|---|
| Hydroxylamine sulfate | 2 g |
| Disodium ethylenediaminetetraacetate dihydrate | 2 g |
| 4-Amino-3-methyl-N-ethyl-N-(β-hydroxyethyl)-aniline monosulfate | 4 g |
| Water | to make 1 l |
| Stop Solution: | |
| Sodium thiosulfate | 10 g |
| Ammonium thiosulfate (70% aqueous solution) | 30 ml |
| Acetic acid | 30 ml |
| Sodium acetate | 5 g |
| Potassium alum | 15 g |
| Water | to make 1 l |
| Bleaching Solution: | |
| Sodium (ethylenediaminetetra-acetato)iron (III) dihydrate | 100 g |
| Potassium bromide | 50 g |
| Ammonium nitrate | 50 g |
| Boric acid | 5 g |
| Aqueous ammonia | to adjust to pH 5.0 |
| Water | to make 1 l |
| Fixing Solution: | |
| Sodium thiosulfate | 150 g |
| Sodium sulfite | 15 g |
| Borax | 12 g |
| Glacial acetic acid | 15 ml |
| Potassium alum | 20 g |
| Water | to make 1 l |
| Stabilizing Solution: | |
| Boric acid | 5 g |
| Sodium citrate | 5 g |
| Sodium metaborate (tetrahydrate) | 3 g |
| Potassium alum | 15 g |
| Water | to make 1 l |

Immediately after the development processing, the curl of the dry sample in terms of 1/R (m) (R: radius of curl) was measured at 25° C. and 60% RH in accordance with Test Method A of ANSI/ASC pH1.29-1985 (hereinafter referred to as ANSI curl).

The ANSI curl of Sample A-1, i.e., a sample whose support was not subjected to a heat treatment for anticurling was taken as an absolute core-set curl. The ANSI curl of other samples whose support had been subjected to the heat treatment was taken as a controlled curl. The anticurl effect of the present invention was evaluated in terms of a percent reduction in ANSI curl obtained according to formula:

Reduction in ANSI Curl (%) = [(Absolute Curl) − (Controlled Curl)]/(Absolute Curl) × 100

7-2) Development Processability
7-2-1) Uniformity

The sample film was subjected to a white exposure in order to complete development processing so that the color generation transmission density after development processing is from 0.9 to 1.1 in terms of a green light photometric density by using a densitometer Model 310T (manufactured by X-Rite Co.).

The thus developed sample film was placed on a light table (LT-77H, made by Shashin Kagaku Kabushiki Kaisha) and the occurrence of uneven density was visually observed.

7-2-2) Fold Resistance

A heel folding of the developed sample was visually observed.

7-3) Adhesion
7-3-1) Dry Adhesion

The emulsion surface of the green sample (before development) or dry sample (after development) was cross-hatched with a razor at 5 mm intervals to make 36 squares. An adhesive tape (Nitto Tape, produced by Nitto Electric Industrial Co., Ltd.) was adhered thereto and rapidly stripped off at a peel angle of 180°. The adhesion was evaluated according to the proportion of squares remaining on the support. Those samples keeping 95% or more, 90% or more, 60% or more, or less than 60% of the squares on the support were rated A, B, C or D, respectively.

7-3-2) Wet Adhesion

The emulsion surface of the wet sample while in a developer, a fixing bath or a washing bath was scratched with a stylus to make a cross mark. The mark was strongly rubbed 5 times with the tip of a finger. The adhesion was evaluated by the maximum width of peel along the line of the mark. Those samples which underwent no peel further than the scratch were rated A, and those samples whose maximum peel was within 2 mm, within 5 mm, or more than 5 mm were rated B, C or D, respectively.

7-4) Folding Endurance

The dry sample was repeatedly folded in accordance with the specification of ISO 8776-1988 by means of an MIT fatigue tester (manufactured by Toyo Seiki Seisakusho). The number of times of reciprocal folding at failure was measured.

The results of these measurements are shown in Table 3 below.

TABLE 3

| Sample | UV Irradiation Temp. of Support (°C.) | Reduction in Intrinsic Viscosity (%) | ANSI Curl | Reduction in ANSI Curl (%) | Development Processability | | Adhesion | | | Folding Endurance |
|---|---|---|---|---|---|---|---|---|---|---|
| | | | | | Uniformity | Fold Resistance | Green Sample | Wet Sample | Dry Sample | |
| A-1 (compar.) | — | 0 | 122 | — | good | poor | D | D | D | >1000 |
| A-2-1 (invention) | 115 | 0.1 | 45 | 63 | good | good | C | C | C | >1000 |
| A-2-2 (invention) | 115 | 0.5 | 48 | 61 | good | good | C | C | C | >1000 |
| A-2-3 (invention) | 115 | 1 | 51 | 58 | good | good | A | A | A | >1000 |
| A-2-4 (invention) | 130 | 1 | 75 | 39 | good | good | A | A | A | >1000 |
| A-2-5 (invention) | 150 | 1 | 98 | 20 | good | good | A | A | A | >1000 |
| A-2-6 (invention) | 115 | 5 | 49 | 60 | good | good | A | A | A | >1000 |
| A-2-7 | 115 | 10 | 46 | 62 | good | good | A | A | A | >1000 |

TABLE 3-continued

| Sample | UV Irradiation Temp. of Support (°C.) | UV Irradiation Reduction in Intrinsic Viscosity (%) | ANSI Curl | Reduction in ANSI Curl (%) | Development Processability Uniformity | Development Processability Fold Resistance | Adhesion Green Sample | Adhesion Wet Sample | Adhesion Dry Sample | Folding Endurance |
|---|---|---|---|---|---|---|---|---|---|---|
| A-2-8 (invention) | 115 | 25 | 44 | 64 | good | good | A | A | A | >1000 |
| A-2-9 (invention) | 115 | 50 | 47 | 61 | good | good | A | A | A | >1000 |
| A-2-10 (compar.) | 115 | 60 | 45 | 63 | good | good | C | C | C | 48 |
| A-3 (compar.) | 115 | 10 | 118 | 3 | good | poor | A | A | A | >1000 |
| A-4 (invention) | 115 | 10 | 53 | 57 | good | good | A | A | A | >1000 |
| A-5 (compar.) | 115 | 10 | 117 | 4 | good | poor | A | A | A | >1000 |

As is apparent from Table 3, Samples A-2 (inclusive of Samples A-2-1 to A-2-10) and A-4 whose PEN support had been subjected to a heat treatment at a temperature not lower than 50° C. and below the Tg of PEN exhibit significantly improved anticurl properties over Sample A-1 whose support had not been heat-treated, whereas Samples A-3 and A-5 whose support had been subjected to a heat treatment at a temperature of lower than 50° C. or higher than the Tg of PEN have serious curl, showing no effect of the heat treatment.

It is also seen that adhesion between an emulsion layer and a support can be improved by UV irradiation of the support. In particular, when UV irradiation is conducted to such a degree that the intrinsic viscosity of the portion of the support from the irradiated surface to the depth of 15 μm is reduced by 1 to 50%, the adhesion is remarkably improved without impairing the strength of the support.

Further, it is revealed that the anti-curling properties are ensured when the temperature of the support while being UV-irradiated is not higher than the Tg of the support.

EXAMPLE 2

The supports shown in Table 4 below were prepared in the same manner as described in Example 1.

TABLE 4

| Sample Support No. | Material | Thickness (μm) | Tg (°C.) | Longitudinal Stretching Temp. (CD Side) (°C.) | Heat Treatment (24 hrs) Temp. (°C.) |
|---|---|---|---|---|---|
| A-1 | PEN | 80 | 119 | 140 | none |
| A-2 | PEN | 80 | 119 | 140 | 110 |
| B | PBC-1 | 80 | 92 | 110 | 82 |
| C | PBB-2 | 80 | 95 | 115 | 85 |

Each support was subjected to UV irradiation in the same manner as in Example 1, except that the temperature of the support to be UV-irradiated and the degree of UV irradiation (a percent reduction in intrinsic viscosity) were changed as shown in Table 5 below. The UV-irradiated or non-irradiated support was coated with a subbing layer and a backing layer in the same manner as in Example 1, except that the temperature of the coating composition for a subbing layer and the temperature of the support to be coated with the composition for a subbing layer were varied as shown in Table 5.

TABLE 5

| Sample Support No. | Material | UV Irradiation Temp. of Support (°C.) | UV Irradiation Reduction in Intrinsic Viscosity (%) | Coating of Subbing Layer Temp. of Coating Composition (°C.) | Coating of Subbing Layer Temp. of Substrate (°C.) |
|---|---|---|---|---|---|
| A-1-1 (Compar.) | PEN | non-irradiated | | 25 | 25 |
| A-1-2 (Compar.) | PEN | non-irradiated | | 25 | 35 |
| A-1-3 (Compar.) | PEN | non-irradiated | | 30 | 30 |
| A-1-4 (Compar.) | PEN | non-irradiated | | 35 | 35 |
| A-1-5 (Invention) | PEN | 60 | 0.5 | 25 | 35 |
| A-1-6 (Invention) | PEN | 70 | 0.5 | 25 | 35 |
| A-1-7 (Invention) | PEN | 115 | 0.5 | 18 | 18 |
| A-1-8 (Invention) | PEN | 115 | 0.5 | 25 | 25 |
| A-1-9 (Invention) | PEN | 115 | 0.5 | 25 | 35 |

TABLE 5-continued

| Sample Support No. | Material | UV Irradiation Temp. of Support (°C.) | Reduction in Intrinsic Viscosity (%) | Coating of Subbing Layer Temp. of Coating Composition (°C.) | Temp. of Substrate (°C.) |
|---|---|---|---|---|---|
| A-1-10 (Invention) | PEN | 115 | 0.5 | 30 | 30 |
| A-1-11 (Invention) | PEN | 115 | 0.5 | 35 | 35 |
| A-1-12 (Invention) | PEN | 185 | 0.5 | 18 | 18 |
| A-1-13 (Invention) | PEN | 185 | 0.5 | 25 | 25 |
| A-1-14 (Invention) | PEN | 185 | 0.5 | 25 | 35 |
| A-1-15 (Invention) | PEN | 185 | 0.5 | 30 | 30 |
| A-1-16 (Invention) | PEN | 185 | 0.5 | 35 | 35 |
| A-1-17 (Invention) | PEN | 210 | 0.5 | 25 | 35 |
| A-1-18 (Invention) | PEN | 115 | 2 | 18 | 18 |
| A-1-19 (Invention) | PEN | 185 | 2 | 18 | 18 |
| A-1-20 (Invention) | PEN | 210 | 2 | 18 | 18 |
| A-1-21 (Invention) | PEN | 115 | 0.5 | 18 | 18 |
| A-1-22 (Invention) | PEN | 115 | 1 | 18 | 18 |
| A-1-23 (Invention) | PEN | 115 | 10 | 18 | 18 |
| A-2-11 (Invention) | PEN | 115 | 0.1 | 18 | 18 |
| A-2-12 (Invention) | PEN | 115 | 0.5 | 18 | 18 |
| A-2-13 (Invention) | PEN | 115 | 0.5 | 25 | 35 |
| A-2-14 (Invention) | PEN | 115 | 1 | 25 | 35 |
| B (Invention) | PBC-1 | 82 | 1 | 25 | 35 |
| C (Invention) | PBB-2 | 85 | 1 | 25 | 35 |

A multi-color light-sensitive material was prepared in the same manner as in Example 1, except for using each of the thus prepared supports. Each of the resulting samples was evaluated in the same manner as in Example 1. The results obtained are shown in Table 6 below.

TABLE 6

| Sample No. | Adhesion Green Sample | Wet Sample | Dry Sample | ANSI Curl | Reduction in ANSI Curl (%) | Development Processability Uniformity | Fold Resistance | Folding Endurance |
|---|---|---|---|---|---|---|---|---|
| A-1-1 | D | D | D | 122 | — | good | poor | >1000 |
| A-1-2 | D | D | D | 122 | — | good | poor | >1000 |
| A-1-3 | D | D | D | 122 | — | good | poor | >1000 |
| A-1-4 | D | D | D | 122 | — | good | poor | >1000 |
| A-1-5 | C | C | C | 122 | — | good | poor | >1000 |
| A-1-6 | B | B | B | 122 | — | good | poor | >1000 |
| A-1-7 | C | C | C | 122 | — | good | poor | >1000 |
| A-1-8 | B | B | B | 122 | — | good | poor | >1000 |
| A-1-9 | B | B | B | 122 | — | good | poor | >1000 |
| A-1-10 | B | B | B | 122 | — | good | poor | >1000 |
| A-1-11 | B | B | B | 122 | — | good | poor | >1000 |
| A-1-12 | B | B | B | 122 | — | good | poor | >1000 |
| A-1-13 | A | A | A | 122 | — | good | poor | >1000 |
| A-1-14 | A | A | A | 122 | — | good | poor | >1000 |
| A-1-15 | A | A | A | 122 | — | good | poor | >1000 |
| A-1-16 | A | A | A | 122 | — | good | poor | >1000 |
| A-1-17 | B | B | B | 122 | — | good | poor | >1000 |
| A-1-18 | A | A | A | 122 | — | good | poor | >1000 |
| A-1-19 | A | A | A | 122 | — | good | poor | >1000 |
| A-1-20 | A | A | A | 122 | — | good | poor | >1000 |
| A-1-21 | C | C | C | 122 | — | good | poor | >1000 |
| A-1-22 | A | A | A | 122 | — | good | poor | >1000 |

TABLE 6-continued

| Sample No. | Adhesion | | | ANSI Curl | Reduction in ANSI Curl (%) | Development Processability | | Folding Endurance |
|---|---|---|---|---|---|---|---|---|
| | Green Sample | Wet Sample | Dry Sample | | | Uniformity | Fold Resistance | |
| A-1-23 | A | A | A | 122 | — | good | poor | >1000 |
| A-2-11 | C | C | C | 45 | 63 | good | good | >1000 |
| A-2-12 | C | C | C | 48 | 61 | good | good | >1000 |
| A-2-13 | B | B | B | 48 | 61 | good | good | >1000 |
| A-2-14 | A | A | A | 48 | 61 | good | good | >1000 |
| B | B | B | B | 68 | 56 | good | good | >1000 |
| C | B | B | B | 65 | 53 | good | good | >1000 |

It is seen from the results in Table 6 that a preferred temperature of the support to be UV-irradiated is 70° C. or higher and that the temperature of the subbing layer coating composition and that of the support to be coated are preferably between 20° and 50° C. It is also seen that the effects of the present invention are produced in using not only PEN but other polyesters as long as having a Tg of from 90° to 200° C.

While the invention has been described in detail and with reference to specific examples thereof, it will be apparent to one skilled in the art that various changes and modifications can be made therein without departing from the spirit and scope thereof.

What is claimed is:

1. A silver halide photographic material comprising a polyester support having provided thereon at least one light-sensitive silver halide emulsion layer, wherein said polyester support has a glass transition temperature of from 90° to 200° C. and has had at least one side thereof subjected to ultraviolet-light irradiation at a support temperature of from 70° to 230° C.,
   wherein said ultraviolet-light irradiation is carried out after heat setting following stretching,
   wherein said stretching is biaxial stretching,
   wherein said polyester support comprises a naphthalenedicarboxylic acid in a proportion or at least 30 mol % based on the total dicarboxylic acid component, and
   wherein a subbing layer comprising gelatin or a compound made from gelatin is provided on the support.

2. A silver halide photographic material as claimed in claim 1, wherein said support temperature while being irradiated with ultraviolet light is from 160° to 230° C.

3. A silver halide photographic material as claimed in claim 1, wherein said ultraviolet-light irradiation is carried out to such an extent that the intrinsic viscosity of the polyester constituting the surface portion of said support to a depth of 15 μm is reduced by 1 to 50%.

4. A silver halide photographic material as claimed in claim 1, wherein said support has-had been coated with a coating composition for a subbing layer at a coating composition temperature and a support temperature of from 20° to 50° C.

5. A silver halide photographic material as claimed in claim 1, wherein said support has had been subjected to a heat treatment at a temperature of not less than 50° C. and less than the glass transition temperature thereof prior to coating of said light-sensitive silver halide emulsion layer.

6. A silver halide photographic material as claimed in claim 1, wherein said ultraviolet-light irradiation is carried out at a support temperature of not more than the glass transition temperature.

7. A silver halide photographic material as claimed in claim 1, wherein said polyester support mainly comprises polyethylene naphthalate.

8. A silver halide photographic material as claimed in claim 1, wherein said polyester support is polyethylene-2,6-naphthalenedicarboxylate.

* * * * *